United States Patent
Kang et al.

(10) Patent No.: US 7,440,223 B2
(45) Date of Patent: Oct. 21, 2008

(54) WRITTEN-IN REPEATABLE RUN-OUT CORRECTION FOR HARD DISK DRIVES

(75) Inventors: Chang-Ik Kang, Fremont, CA (US); Young-Hoon Kim, Cupertino, CA (US); Hyung Jai Lee, Cupertino, CA (US)

(73) Assignee: Samsung Electronics Co., ltd., Suwon (KR)

( * ) Notice: Subject to any disclaimer, the term of this patent is extended or adjusted under 35 U.S.C. 154(b) by 71 days.

(21) Appl. No.: 11/603,371

(22) Filed: Nov. 22, 2006

(65) Prior Publication Data

US 2008/0117541 A1 May 22, 2008

(51) Int. Cl.
*G11B 5/596* (2006.01)
(52) U.S. Cl. .................................... 360/77.04
(58) Field of Classification Search .................. None
See application file for complete search history.

(56) References Cited

U.S. PATENT DOCUMENTS

| | | | | | |
|---|---|---|---|---|---|
| 5,404,253 | A | * | 4/1995 | Painter | 360/77.04 |
| 5,444,583 | A | * | 8/1995 | Ehrlich et al. | 360/78.09 |
| 5,585,976 | A | * | 12/1996 | Pham | 360/77.04 |
| 5,708,581 | A | * | 1/1998 | Martinez | 360/77.04 |
| 5,721,648 | A | * | 2/1998 | Phan et al. | 360/78.09 |
| 5,886,846 | A | * | 3/1999 | Pham et al. | 360/77.04 |
| 5,978,169 | A | * | 11/1999 | Woods | 360/77.04 |
| 6,023,390 | A | * | 2/2000 | Kang | 360/77.04 |
| 6,347,018 | B1 | * | 2/2002 | Kadlec et al. | 360/77.08 |
| 6,850,385 | B1 | * | 2/2005 | Woods | 360/77.04 |
| 6,859,341 | B2 | * | 2/2005 | Min et al. | 360/77.04 |
| 7,031,095 | B2 | * | 4/2006 | Kim et al. | 360/78.09 |
| 7,330,332 | B2 | * | 2/2008 | Baek et al. | 360/77.04 |
| 2006/0176605 | A1 | * | 8/2006 | Baek et al. | 360/77.04 |
| 2006/0187571 | A1 | * | 8/2006 | Kim et al. | 360/78.09 |
| 2006/0291087 | A1 | * | 12/2006 | Suh et al. | 360/77.02 |

* cited by examiner

*Primary Examiner*—Hoa T Nguyen
*Assistant Examiner*—James L Habermehl
(74) *Attorney, Agent, or Firm*—Ben J. Yorks; Irell & Manella LLP

(57) ABSTRACT

A hard disk drive with a circuit that provides a control signal to a voice coil motor to move a head across a disk. The circuit includes a repeatable run-out estimator in a feed forward control loop to control the movement of the head. The repeatable run-out estimator compensates for a constant bias torque disturbance in the drive.

8 Claims, 5 Drawing Sheets

WRITTEN-IN REPEATABLE RUN-OUT CORRECTION FOR HARD DISK DRIVES

BACKGROUND OF THE INVENTION

1. Field of the Invention

The present invention relates to a servo routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. The heads are typically electronically connected to the circuits of the drive by a flex cable.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification, respectively.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track.

The servo fields are written during the manufacturing process of the disk drive. The servo is typically written with a precise servo writer. Any vibration in the drive and/or servo writer during the writing of servo may create repeatable run-out("RRO")in the servo fields. Repeatable run-out can increase the settle time during a seek routine and ultimately increase access time to retrieve data from the drive.

Some servo routines utilize a repeatable run-out estimator in a feed forward control loop to account for repeatable run-out on the disks. Unfortunately, prior RRO estimates did not account for DC torque disturbances such as flex circuit bias. If a DC torque disturbance is present in the drive, the servo may not converge to zero. It is therefore desirable to provide a servo that does account for the torque disturbances.

BRIEF SUMMARY OF THE INVENTION

A hard disk drive with a circuit that provides a control signal to a voice coil motor to move a head across a disk. The circuit includes a repeatable run-out estimator in a feed forward control loop to control the movement of the head. The repeatable run-out estimator compensates for a constant bias torque disturbance in the drive.

DETAILED DESCRIPTION

Described is a hard disk drive with a circuit that provides a control signal to a voice coil motor to move a head across a disk. The circuit includes a repeatable run-out estimator in a feed forward control loop to control the movement of the head. The repeatable run-out estimator compensates for a constant bias torque disturbance in the drive.

Figure 2:
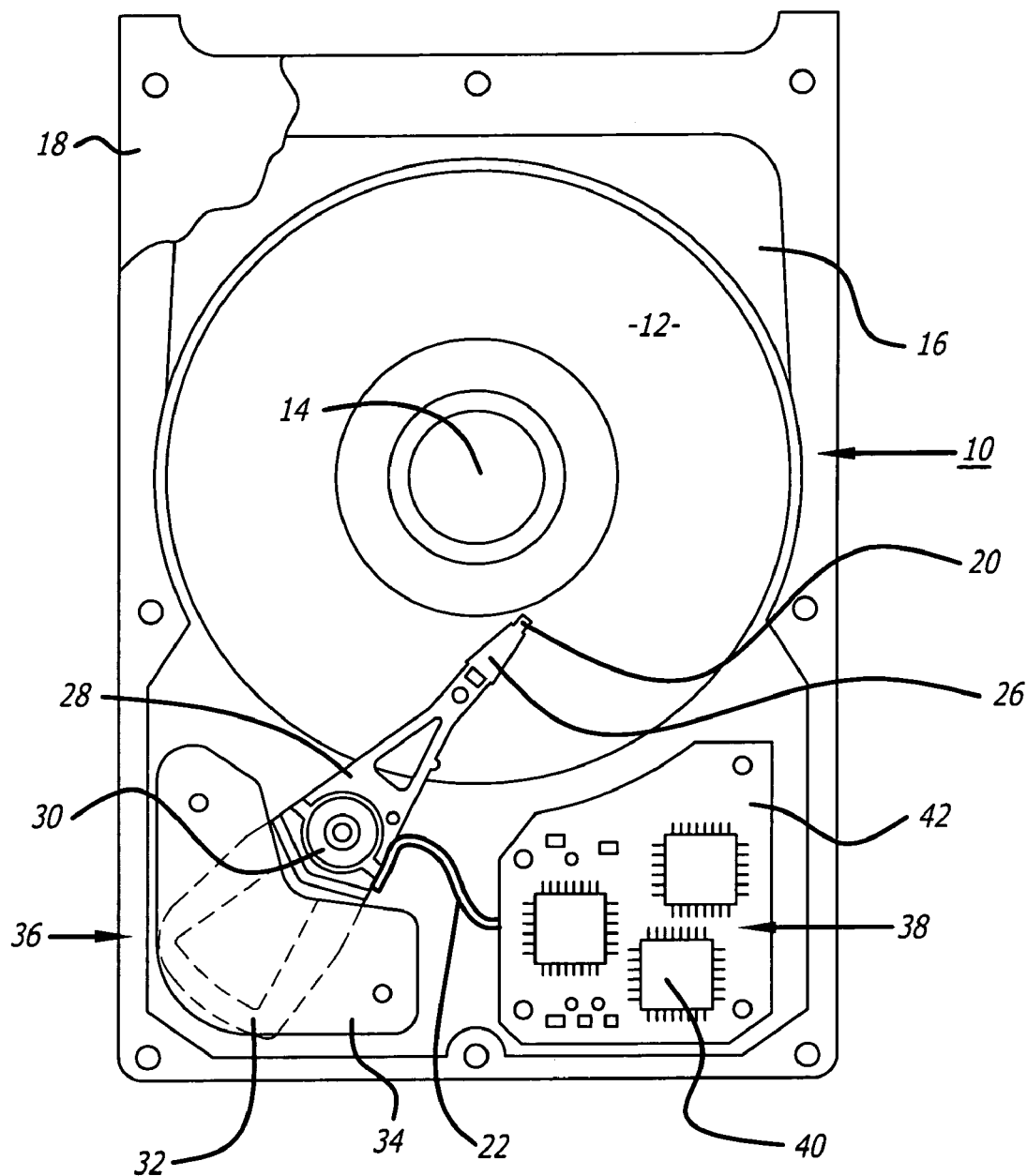
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux. The heads are connected to a flex circuit 22. The flex circuit 22 provides an electrical connection between the head 20 and the electrical circuits of the drives.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor. (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
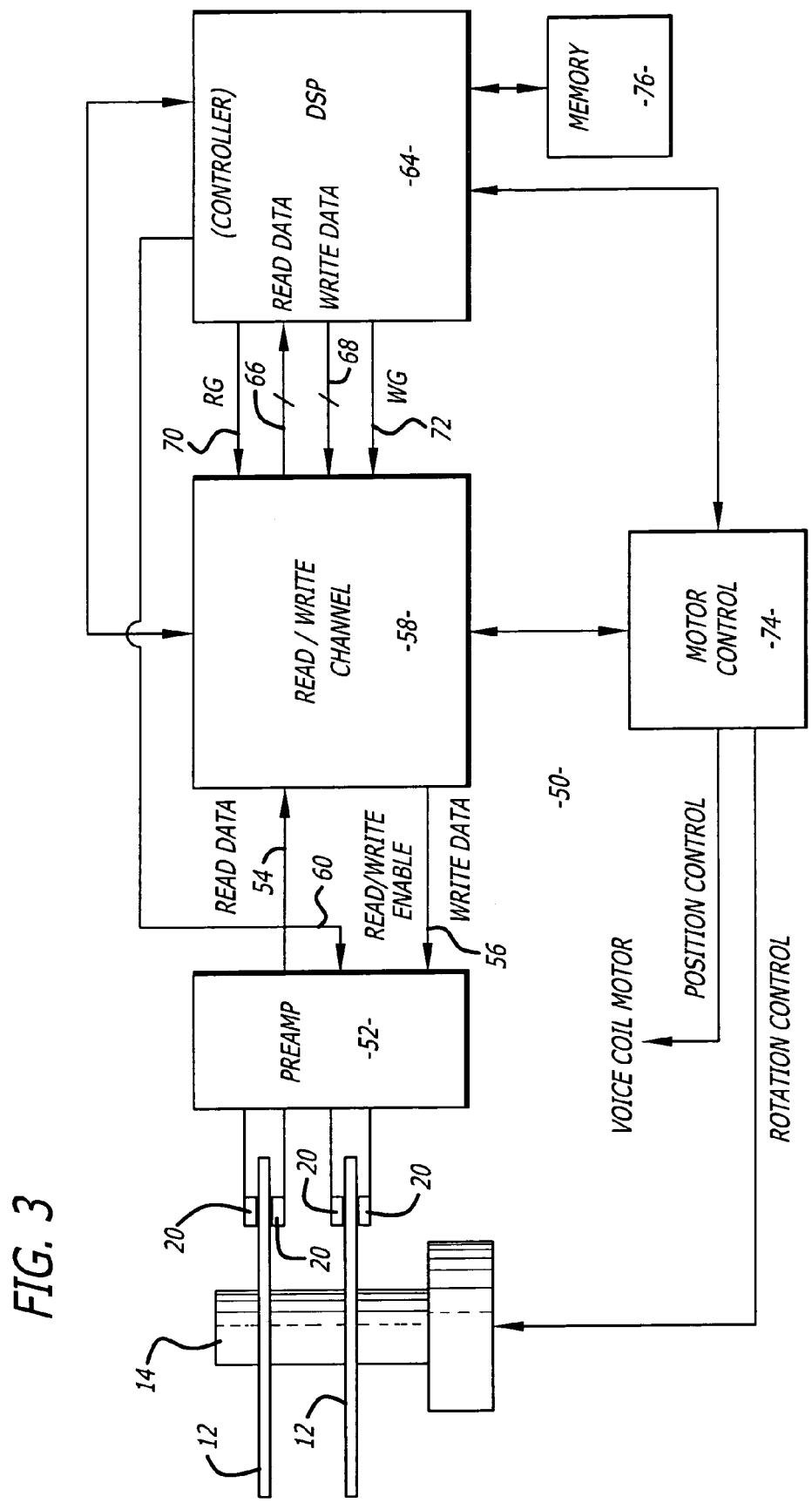
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read-only-memory ("ROM") that contains instructions that are read by the controller 64.

Figure 1:
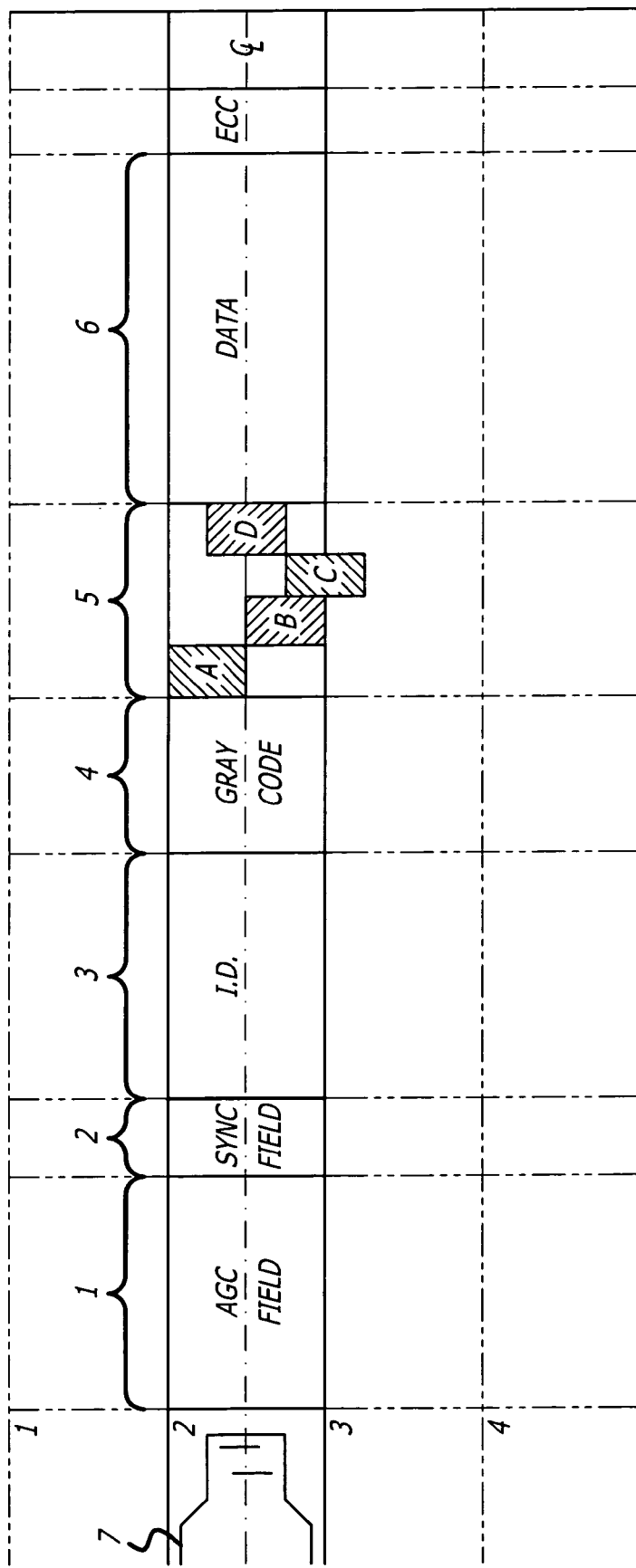
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 4:
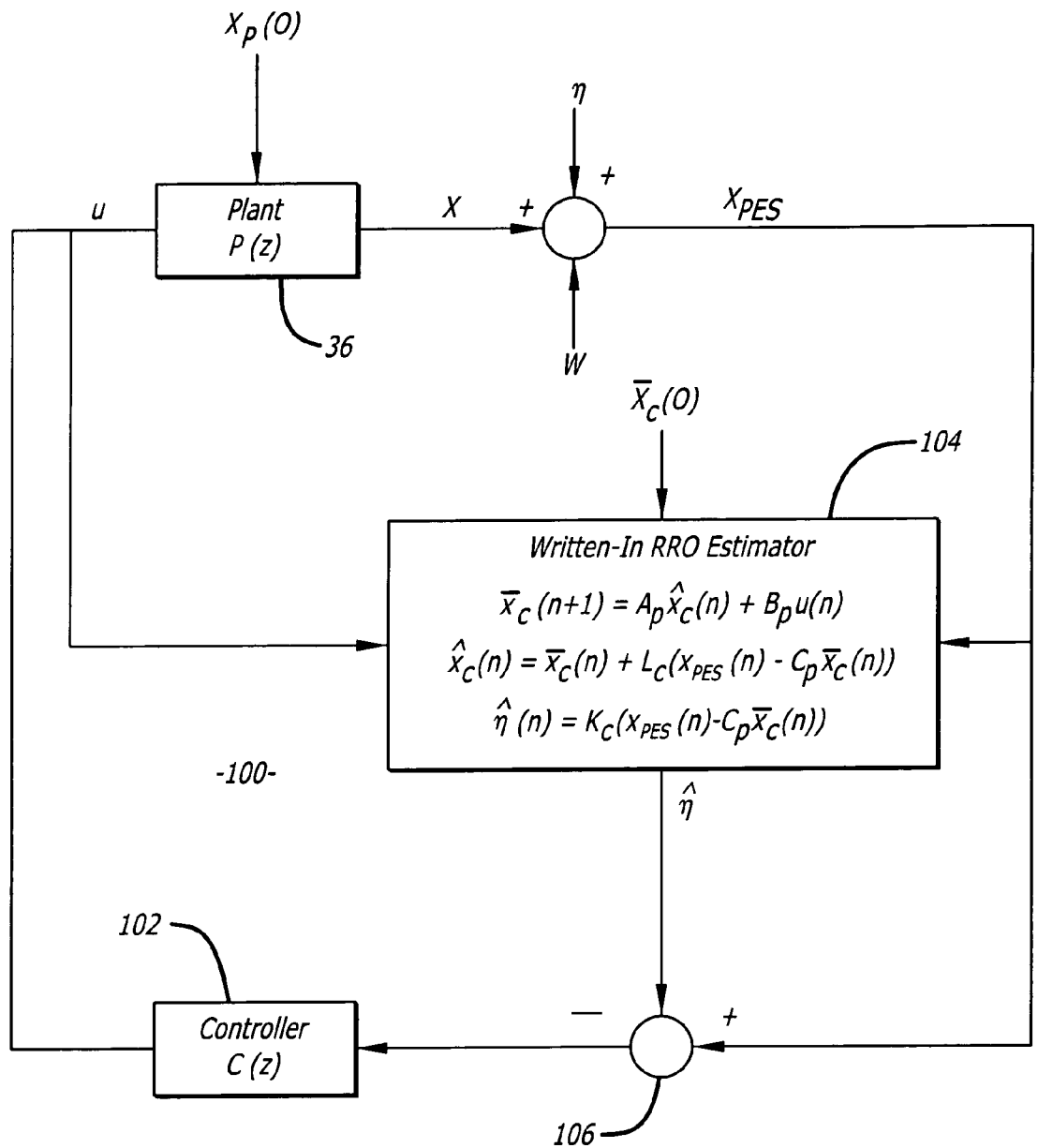
FIG. 4 is a schematic of a servo for the hard disk drive with a repeatable run-out estimator that compensates for a bias constant torque disturbance in the disk drive.

FIG. 4 shows a schematic of a servo system 100 used to perform a seek operation. The servo is typically performed by the controller 64.

The servo system includes a controller 102 that provides a control signal u to a voice coil motor 36. The system utilizes a measured head position x. A constant bias torque disturbance n is represented as being added to the measured position x to create $x_{PES}$.

The servo system 100 also includes an RRO estimator 104 that receives as inputs, the measured position $x_{PES}$ and the control signal u. The RRO estimator 104 generates an RRO estimate $\hat{n}$ that is combined with $x_{PES}$ by adder 106. The output of the adder 106 is provided to the controller 102.

The controller 102 can be designed with the following equations and derivations. Neglecting the high-frequency flexible modes, the VCM actuator may be described by the following dynamic model:

$$\ddot{x}=\dot{v}=K_a(u+w) \quad (1)$$

The constant $K_a$ represents the acceleration constant of actuator. The variables x and v represent absolute head position and head velocity, respectively. The variable x indicates the gap between the head and the center of an ideal servo track. The position information that is actually measured is PES $x_{PES}$ which is the gap between the head and the center of the actual servo track. The relationship between x and $x_{PES}$ is $$x_{PES}=x+\eta \quad (2)$$

where $\eta$ denotes the written-in RRO. The control signal u is a current provided to the voice coil motor. Input w represents the disturbance torque acting on the actuator due to the flexible cable attached to the actuator. The disturbance torque varies depending on actuator positions and movement direction. However, the disturbance can be assumed to be constant with time when the actuator is almost at rest for a track-following operation. Thus:

$$\dot{w}=0 \quad (3)$$

The PES $x_{PES}$ is obtained at discrete times by taking periodic samples of a readback signal whenever the head passes over servo sectors. Because the system operates in periodic time increments, the discrete equivalent to the continuous-time system given by equations (1), (2), and (3) must be developed. Considering the effect of control delay by the controller 64 execution, the voice coil motor may be defined with the following discrete time model:

$$x(n+1)=Ax(n)+B_0u(n)+B_1u(n-1)$$

$$x_{PES}(n)=Cx(n)+\eta(n) \quad (4)$$

State vector x, system matrix A, column vectors $B_0$ and $B_1$, and row vector C can be defined by:

$$x = \begin{bmatrix} x \\ v \\ w \end{bmatrix} \quad A = \begin{bmatrix} 1 & T_s & K_a T_s^2/2 \\ 0 & 1 & K_a T_s \\ 0 & 0 & 1 \end{bmatrix} \quad (5)$$

$$B_0 = \begin{bmatrix} K_a(T_s-T_d)^2/2 \\ K_a(T_s-T_d) \\ 0 \end{bmatrix} \quad B_1 = \begin{bmatrix} K_a(2T_s-T_d)T_d/2 \\ K_a T_d \\ 0 \end{bmatrix}$$

$$C = \begin{bmatrix} 1 \\ 0 \\ 0 \end{bmatrix}^T$$

The constants $T_s$ and $T_d$ are sampling period and control delay, respectively. To place equations (4) and (5) in standard state-space form, the term u(n−1) must be eliminated. First, the state vector is augmented as:

$$x_p(n)=[x(n)v(n)w(n)u(n-1)]^T \quad (6)$$

The resulting state equation is:

$$x_p(n+1)=A_p x_p(n)+B_p u(n)$$

$$x_{PES}(n)=C_p x_p(n)+\eta(n) \quad (7)$$

$A_p$, $B_p$, and $C_p$ are defined as:

$$A_p = \begin{bmatrix} A & B_1 \\ 0 & 0 \end{bmatrix} \quad B_p = \begin{bmatrix} B_0 \\ 1 \end{bmatrix} \quad C_p = [C \; 0] \quad (8)$$

The object of servo control is to have the heads track the center of the ideal servo track precisely. Control law can be the feedback of a linear combination of all state elements. The state feedback controller can be written as:

$$u(n)=-K_f\hat{x}_p(n)=-K_x\hat{x}(n)-K_v\hat{v}(n)-\hat{w}(n) \quad (9)$$

$\hat{x}_p(n)$ is a state estimate vector defined by:

$$\hat{x}_p(n)=[\hat{x}(n)\hat{v}(n)\hat{w}(n)u(n-1)]^T \quad (10)$$

and $K_f$ is feedback gain vector defined by:

$$K_f=[K_x \; K_v \; 1 \; 0] \quad (11)$$

where $K_x$ and $K_v$ are the position gain and velocity gain, respectively. The estimate $\hat{w}$ is included in feedback to suppress the effect of constant disturbance torque w and the previous control input u(n−1) is excluded in the feedback.

State estimator is used to estimate an entire state vector from the position measurement and control input. A current state estimator can be used, which estimates based on the current measurement and, hence the fastest response to unknown disturbances.

$$\bar{x}_p(n+1)=A_p\hat{x}_p(n)+B_p u(n) \quad (12)$$

$$\hat{x}_p(n)=\bar{x}_p(n)+L_e[x_{PES}(n)-C_p\bar{x}_p(n)] \quad (13)$$

$\bar{x}_p$ is a prediction estimate vector and Le is an estimator feedback gain vector.

The combination of the control law equation(9) and the state estimator equations (12) and (13) can be utilized to obtain a transfer function from PES $x_{PES}$ to control input u. Substituting equation (9) in (12) produces:

$$\bar{x}_p(n+1) = (A_p - B_p K_f)\hat{x}_p(n) \quad (14)$$

Combining equations (9), (13), and (14) yields the following equation describing the dynamics of the combined controller:

$$\bar{x}_p(n+1) = A_f(I - L_e C_p)\bar{x}_p(n) + A_f L_e x_{PES}(n)$$

$$u(n) = -K_f(I - L_e C_p)\bar{x}_p(n) - K_f L_e x_{PES}(n) \quad (15)$$

Here I is an identity matrix and $A_f = A_p - B_p K_f$. From equations (2), (7), and (15), the effect of written-in RRO $\eta$ on the control system can be described as $$x(z) = \frac{P(z)C(z)}{1 + P(z)C(z)}\eta(z) \quad (16)$$

where P(z) is the transfer function of the actuator and C(z) is the transfer function of the combined controller. That is, $$P(z) = C_p(zI - A_p)^{-1}B_p$$

$$C(z) = K_f L_e + K_f(I - L_e C_p)[zI - A_f(I - L_e C_p)]^{-1}A_f L_e \quad (17)$$

Since written-in RRO $\eta$ is a periodic function, the actual head position x is also a periodic function in the steady state. This implies that the actual head position x does not converge to zero and fluctuates periodically. The unwanted fluctuations can cause the head to write on the adjacent tracks which in turn produces irrecoverable operation error.

An RRO estimator with an error that decays to zero even in the presence of constant bias torque can be designed with the following equations and derivations. The written-in RRO estimator can be described by:

$$\bar{x}_c(n+1) = A_p \hat{x}_c(n) + B_p u(n) \quad (18)$$

$$\hat{x}_c(n) = \bar{x}_c(n) + L_c(x_{PES}(n) - C_p \bar{x}_c(n)) \quad (19)$$

$$\hat{\eta}(n) = K_c(x_{PES}(n) - C_p \bar{x}_c(n)) \quad (20)$$

The estimate of written-in RRO is the product of some constant $K_c$ and a prediction error. Using equation (7), equation (19) can be rewritten as:

$$\hat{x}_c(n) = \bar{x}_c(n) + L_c C_p(x_p(n) - \bar{x}_c(n)) + L_c \eta(n) \quad (21)$$

and equation (18) can be rewritten as:

$$\bar{x}_c(n+1) = A_p \bar{x}_c(n) + A_p L_c C_p(x_p(n) - \bar{x}_c(n)) + A_p L_c \eta(n) + B_p u(n) \quad (22)$$

Subtracting equation (22) from equation (7) and defining the prediction error as $\tilde{x}(n) = x_p(n) - \bar{x}_c(n)$ produces:

$$\tilde{x}(n+1) = x_p(n+1) - \bar{x}_c(n+1) \quad (23)$$
$$= A_p(x_p(n) - \bar{x}_c(n)) + A_p L_c C_p$$
$$(x_p(n) - \bar{x}_c(n)) - A_p L_c \eta(n)$$
$$= (A_p + A_p L_c C_p)\tilde{x}(n) - A_p L_c \eta(n),$$

$$\tilde{x}(0) = x_p(0) - x_c(0)$$

Using equation (7) and equation (23), we can describe the written-in RRO estimator (18-20) can be described as:

$$\tilde{x}(n+1) = (A_p + A_p L_c C_p)\tilde{x}(n) - A_p L_c \eta(n)$$

$$\hat{\eta}(n) = K_c C_p \tilde{x}(n) + K_c \eta(n) \quad (24)$$

A z-transform of equation (24), produces the following equations:

$$\hat{\eta}(z) = K_c C_p(zI - A_p - A_p L_c C_p)^{-1}\tilde{x}(0) + \quad (25)$$
$$K_c(1 - C_p(zI - A_p - A_p L_c C_p)^{-1}A_p L_c)\eta(z)$$

The first term on the right-hand side of equation (25) is the effect of an initial prediction error $\tilde{x}(0) = x_p(0) - \bar{x}_c(0)$ on the estimate $\hat{\eta}$. The term can be made to decay to zero exponentially by choosing $L_c$ such that $A_p + A_p L_c C_p$ is sufficiently stable. Also, the convergence rate can be controlled because the voice coil motor actuator (7) is an observable system and hence all eigenvalues of $A_p + A_p L_c C_p$ can be assigned arbitrarily. The effect of an initial prediction error $\tilde{x}(0)$ on the estimate $\hat{\eta}$ can be eliminated by reading the estimated state $\hat{x}_p(0)$ from the state estimator of baseline controller equations (12) and (13) and setting the initial state $\bar{x}_c(0)$ of the written-in RRO estimator equations (18) and (19) to the estimated state.

The second term on the right-hand side of equation (25) can also be examined to see the following identity:

$$1 - C_p(zI - A_p - A_p L_c C_p)^{-1}A_p L_c = \frac{\det(zI - A_p)}{\det(zI - A_p - A_p L_c C_p)} \quad (26)$$

From this identity and equation (19), it is evident that the second term on the right-hand side of equation (28) is the output of a certain high-pass filter with written-in RRO $\eta$ being the input of the filter. It is reasonable to select the constant $K_c$ so that the high-pass filter has unity gain at z=−1. That is, $$K_c = \frac{\det(I + A_p + A_p L_c C_p)}{\det(I + A_p)} \quad (27)$$

Typically, $\eta$ is high-frequency signal. Therefore, the estimate of written-in RRO $\hat{\eta}$ (25) is very close to the actual written-in RRO $\eta$. The cut-off frequency of the high-pass filter depends on the selection of $L_c$. Selecting $L_c$ to achieve faster rejection of initial prediction error might yield higher cut-off frequency and thus larger estimation error. The trade-off between rejection rate of the initial prediction error and the cut-off frequency of high-pass filter should be taken into account in the selection of $L_c$.

The estimate $\hat{\eta}$ is used to correct PES in a feed-forward manner.

$$x_{PES}^c(n) = x_{PES}(n) - \hat{\eta}(n) \quad (28)$$

Figure 5:
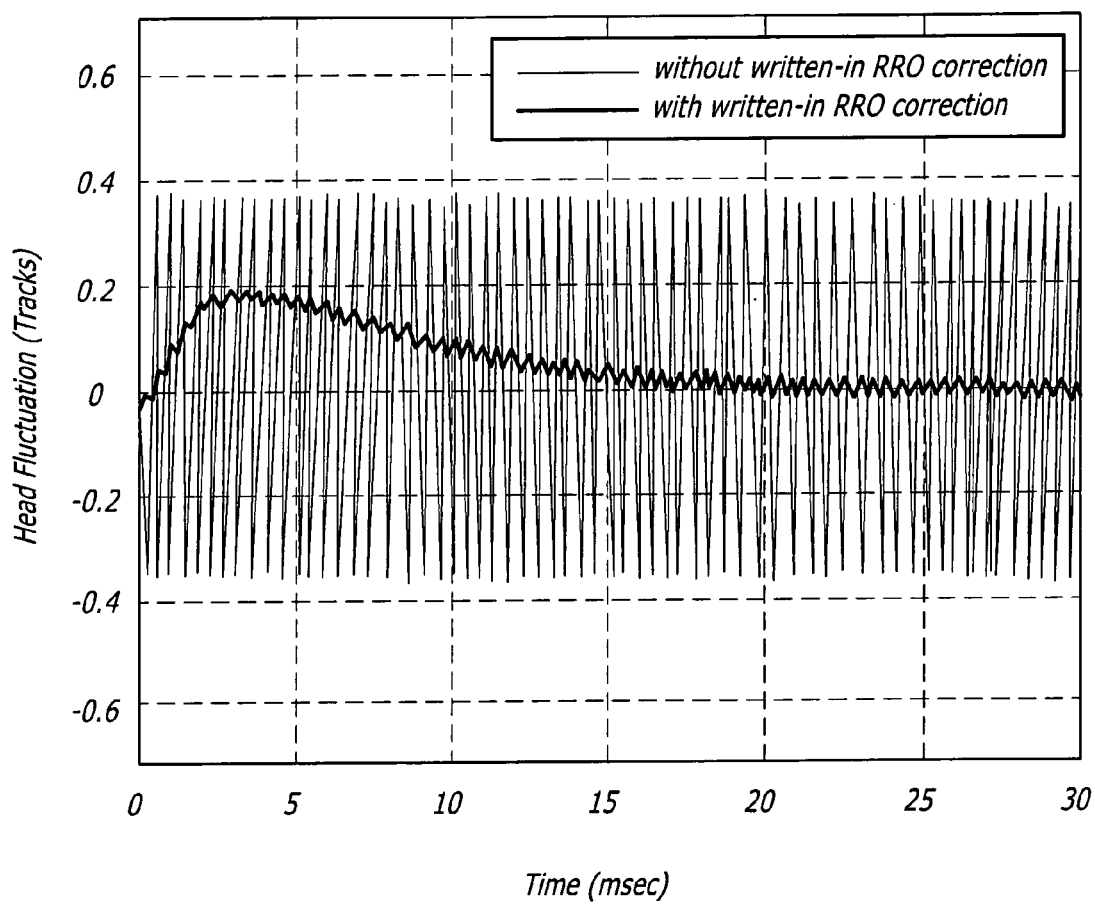
FIG. 5 is a graph showing write head fluctuation between a disk drive of the prior art and a disk drive operating with a repeatable estimator that compensates for the bias constant torque disturbance.

FIG. 5 shows head fluctuation with and without RRO correction in the presence of a constant bias torque disturbance. As can be seen, the RRO correction minimizes head fluctuation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   a flex circuit coupled to said head;
   an actuator arm coupled to said head;
   a voice coil motor coupled to said actuator arm; and,
   a circuit that provides a control signal to said voice coil motor to move said head across said disk, said circuit includes a repeatable run-out estimator in a feed forward control loop to control said movement of said head, said repeatable run-out estimator compensates for a constant bias torque disturbance, said repeatable run-out estimator includes a high pass filter.

2. The hard disk drive of claim 1, wherein said repeatable run-out estimator sets an initial prediction to equal an initial prediction of an estimated plant state.

3. The hard disk drive of claim 1, wherein said circuit includes a controller.

4. A hard disk drive, comprising:
   a disk;
   a head coupled to said disk;
   a flex circuit coupled to said head;
   an actuator arm coupled to said head;
   a voice coil motor coupled to said actuator arm; and,
   circuit means for providing a control signal to said voice coil motor to move said head across said disk using a repeatable run-out estimator in a feed forward control loop, said repeatable run-out estimator compensates for a constant bias torque disturbance, said repeatable run-out estimator includes a high pass filter.

5. The hard disk drive of claim 4, wherein said repeatable run-out estimator sets an initial prediction to equal an initial prediction of an estimated plant state.

6. The hard disk drive of claim 4, wherein said circuit means includes a controller.

7. A method for moving a head across a disk in a hard disk drive, comprising:
   computing a repeatable run-out estimate that compensates for a constant bias torque disturbance, the repeatable run-out estimate includes a high pass filter component;
   generating a control signal with the repeatable run-out estimate; and,
   providing a control signal to a voice coil motor to move a head relative to a disk.

8. The method of claim 7, wherein the repeatable run-out estimator has a component wherein an initial prediction is set to equal an initial prediction of an estimated plant state.

* * * * *